US012623638B1

(12) United States Patent
Ishizuka et al.

(10) Patent No.: US 12,623,638 B1
(45) Date of Patent: May 12, 2026

(54) VEHICLE CONTROL APPARATUS

(71) Applicant: TOYOTA JIDOSHA KABUSHIKI KAISHA, Toyota (JP)

(72) Inventors: Masataka Ishizuka, Okazaki (JP); Takashi Yuma, Toyokawa (JP); Yusuke Yamauchi, Aichi-ken (JP); Masashi Sasaki, Seto (JP); Ryosuke Mayumi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/267,845

(22) Filed: Jul. 14, 2025

(30) Foreign Application Priority Data

Nov. 12, 2024 (JP) ................................. 2024-197771

(51) Int. Cl.
  *B60T 1/00*    (2006.01)
  *B60T 7/12*    (2006.01)
  *F16H 63/48*   (2006.01)
(52) U.S. Cl.
  CPC ................ *B60T 1/005* (2013.01); *B60T 7/12* (2013.01); *F16H 63/483* (2013.01)
(58) Field of Classification Search
  CPC ........... F16H 63/483; B60T 1/005; B60T 7/12
  See application file for complete search history.

(56) References Cited

U.S. PATENT DOCUMENTS

2012/0305360 A1    12/2012  Kitaori et al.

FOREIGN PATENT DOCUMENTS

DE        102020209016 A1 *  1/2022   ......... F16H 63/3483
JP          2010116100 A  *  5/2010   ................ B60T 1/06
JP            5310871 B2    10/2013

* cited by examiner

*Primary Examiner* — Tisha D Lewis
(74) *Attorney, Agent, or Firm* — SoraIP, Inc.

(57) ABSTRACT

When the switching to the ignition-off state (IG-off state Igoff) is performed, the parking switching position (P switching position Ppos) at a time of switching to the IG-off state Igoff is stored in each of a plurality of non-volatile memories as previous positions Mpp1, Mpp2, and in a case where the previous positions Mpp1, Mpp2 acquired from each of the non-volatile memories in the IG-off state Igoff match a P lock position Plp or a non-P lock position NPlp, the previous positions Mpp1, Mpp2 that are matched are determined to be the P switching position Ppos in the IG-off state Igoff. As a result, even in the case of the IG-off state Igoff, the P switching position Ppos is determined with high accuracy without performing an initial position determination control.

2 Claims, 5 Drawing Sheets

FIG. 3

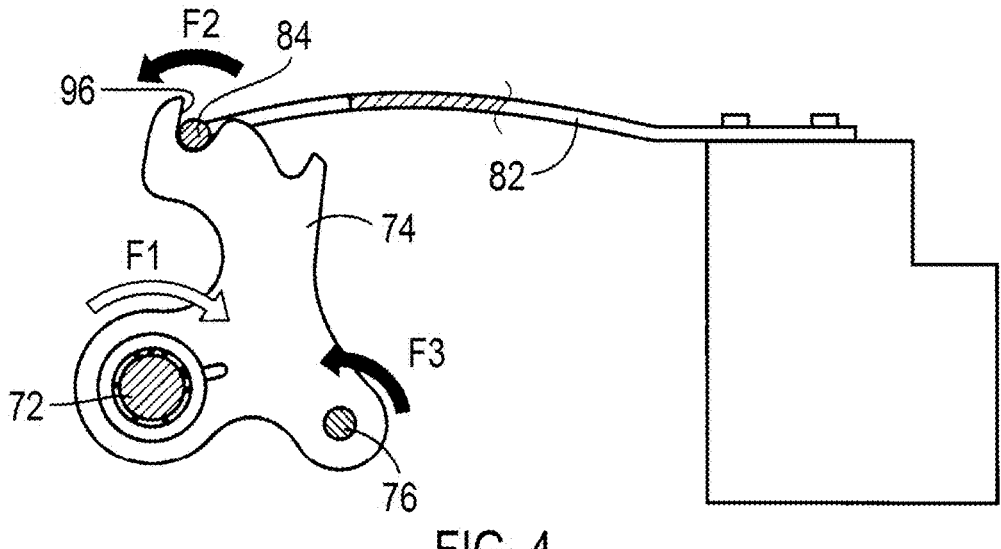

FIG. 4

ELECTRIC POWER 102
SOURCE CONTROLLER

NON-VOLATILE MEMORY 108
Mpp2

(3) RECEIVE ELECTRIC POWER SOURCE STATE PWst

Mpp2    (4) ACQUIRE PREVIOUS POSITION Mpp2

SHIFT CONTROLLER          106

(5) Ppos DETERMINATION
PROCESSING

WHEN Mpp1 = Mpp2 = Plp

Ppos = Plp

WHEN Mpp1 = Mpp2 = NPlp

Ppos = NPlp

WHEN Mpp1 ≠ Mpp2 OR
UNDETERMINED POSITION IS PRESENT

DETERMINE Ppos
BY PERFORMING INITIAL POSITION
DETERMINATION CONTROL 104    (1) INQUIRE Ppos

BIDIRECTIONAL
CHARGING CONTROLLER (6) TRANSMIT Ppos

Rp    Mpp1    (2) RECEIVE
PREVIOUS POSITION Mpp1 AND
INITIAL POSITION Rp

PECU          60

Mpp1    62
NON-VOLATILE MEMORY

VEHICLE CONTROL APPARATUS

CROSS-REFERENCE TO RELATED APPLICATION

This application claims priority to Japanese Patent Application No. 2024-197771 filed on Nov. 12, 2024. The disclosure of the above-identified application, including the specification, drawings, and claims, is incorporated by reference herein in its entirety.

BACKGROUND

1. Technical Field

The present disclosure relates to a control apparatus for a vehicle including a parking lock device selectively switching a parking switching position between a parking lock position and a non-parking lock position by driving an actuator.

2. Description of Related Art

A vehicle including a parking lock device in which a parking switching position is selectively switched between a parking lock position and a non-parking lock position by driving an actuator is known. In such a vehicle, an electric power source state is switched between an ignition-on state in which vehicle travel is enabled and an ignition-off state in which a power supply related to vehicle travel is turned off and vehicle travel is disabled. In the vehicle, when switching to the ignition-on state is performed, control of recognizing and determining the parking switching position at a time of switching to the ignition-on state by driving the actuator is well known. For example, a shift control device for a vehicle described in Japanese Patent No. 5310871 (JP 5310871 B) performs the control. JP 5310871 B discloses a parking lock device switching a parking switching position by using a motor as a drive source. A rotation of the motor is controlled to a target rotation amount by reading a count value of an encoder, and switching to a target parking switching position is performed. In addition, when the switching to the ignition-on state is performed, so-called wall abutment control is performed in which abutment to a wall position, which is a limit position of a movement range of the parking switching position, is performed and a reference position is learned. With the wall abutment control, control (hereinafter, referred to as initial position determination control) of initializing the parking lock device and determining an initial position of the parking switching position (parking lock position or non-parking lock position) is performed. With the initial position determination control, the subsequent switching is possible.

SUMMARY

In the vehicle, the parking switching position is not determined unless switching to the ignition-on state is performed, but in recent vehicles, the parking switching position may be requested to be determined even in the ignition-off state. For example, an electrified vehicle is equipped with a function of performing electric power charging from the outside of the vehicle or electric power supply to the outside of the vehicle (hereinafter, referred to as external bidirectional charging). In the implementation of the external bidirectional charging in the ignition-off state in which the vehicle does not travel, the parking switching position needs to be in the parking lock position from the viewpoint of accident prevention due to rolling or cable dragging of the vehicle and safety assurance due to connection with a high-voltage system (battery). However, in the ignition-off state, there is a problem that the parking switching position is not determined.

As a measure, when the external bidirectional charging is performed in the ignition-off state, it is considered that the initial position determination control is performed to determine the parking switching position. However, in this method, the number of times of performing the initial position determination control may increase, which may affect durability of the parking lock device. Further, a measure may be considered in which the parking switching position is stored in the non-volatile memory as a previous position when the switching to the ignition-off state is performed, and the parking switching position is determined with reference to the stored previous position. However, in this method, since the parking switching position is stored in a single non-volatile memory, it is possible that an erroneous determination is made even when the current position is in fact not the parking lock position, for example, when the parking lock device is replaced. Therefore, there is a demand for increasing the accuracy of the determination.

The present disclosure is made in view of the above circumstances, and is to provide a vehicle control apparatus capable of increasing the accuracy of determination of a parking switching position even when the vehicle is in an ignition-off state in which vehicle travel is disabled.

According to a gist of a first disclosure, (a) a vehicle control apparatus for a vehicle that includes a parking lock device configured to selectively switch, by driving an actuator, a parking switching position between a parking lock position and a non-parking lock position, and in which an electric power source state is switched between an ignition-on state in which vehicle travel is enabled and an ignition-off state in which a power supply related to vehicle travel is turned off and vehicle travel is disabled, the vehicle control apparatus being configured to perform, in a case where switching to the ignition-on state is performed, initial position determination control of recognizing and determining the parking switching position at a time of switching to the ignition-on state by driving the actuator, in which:

(b) the vehicle control apparatus is configured to store, in a case where switching to the ignition-off state is performed, the parking switching position at a time of switching to the ignition-off state in each of a plurality of non-volatile memories as a previous position; and (c) the vehicle control apparatus is configured to determine, in a case where the previous position acquired from each of the non-volatile memories matches the parking lock position or the non-parking lock position in the ignition-off state, the previous position that is matched, as the parking switching position in the ignition-off state.

According to a gist of a second disclosure, one of the non-volatile memories may be provided in the parking lock device.

According to the first disclosure, in a case where switching to the ignition-off state is performed, the parking switching position at a time of switching to the ignition-off state may be stored in each of the non-volatile memories as a previous position. When the previous position acquired from each of the non-volatile memories matches the parking lock position or the non-parking lock position in the ignition-off state, the previous position that is matched may be determined as the parking switching position in the ignition-off state. As a result, even in the ignition-off state, the parking switching position is determined with high accuracy without performing the initial position determination control.

According to the second disclosure, one of the non-volatile memories is provided in the parking lock device. As a result, when the parking lock device is replaced, the previous positions of each of the non-volatile memories do not match. Therefore, it is possible to avoid an erroneous determination of the parking switching position in the ignition-off state as the parking lock position.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a diagram illustrating an example of wall abutment control performed in an initial position determination control;

FIG. 4 is a block diagram illustrating a flow of processing data for an example of a determination control of a parking switching position of the vehicle control apparatus;

DETAILED DESCRIPTION OF EMBODIMENTS

Hereinafter, embodiments of the present disclosure will be described in detail with reference to the drawings. In the following embodiments, the drawings are appropriately simplified or modified, and the dimensional ratios, shapes, and the like of the parts are not necessarily accurately drawn.

Embodiment 1

Figure 1:
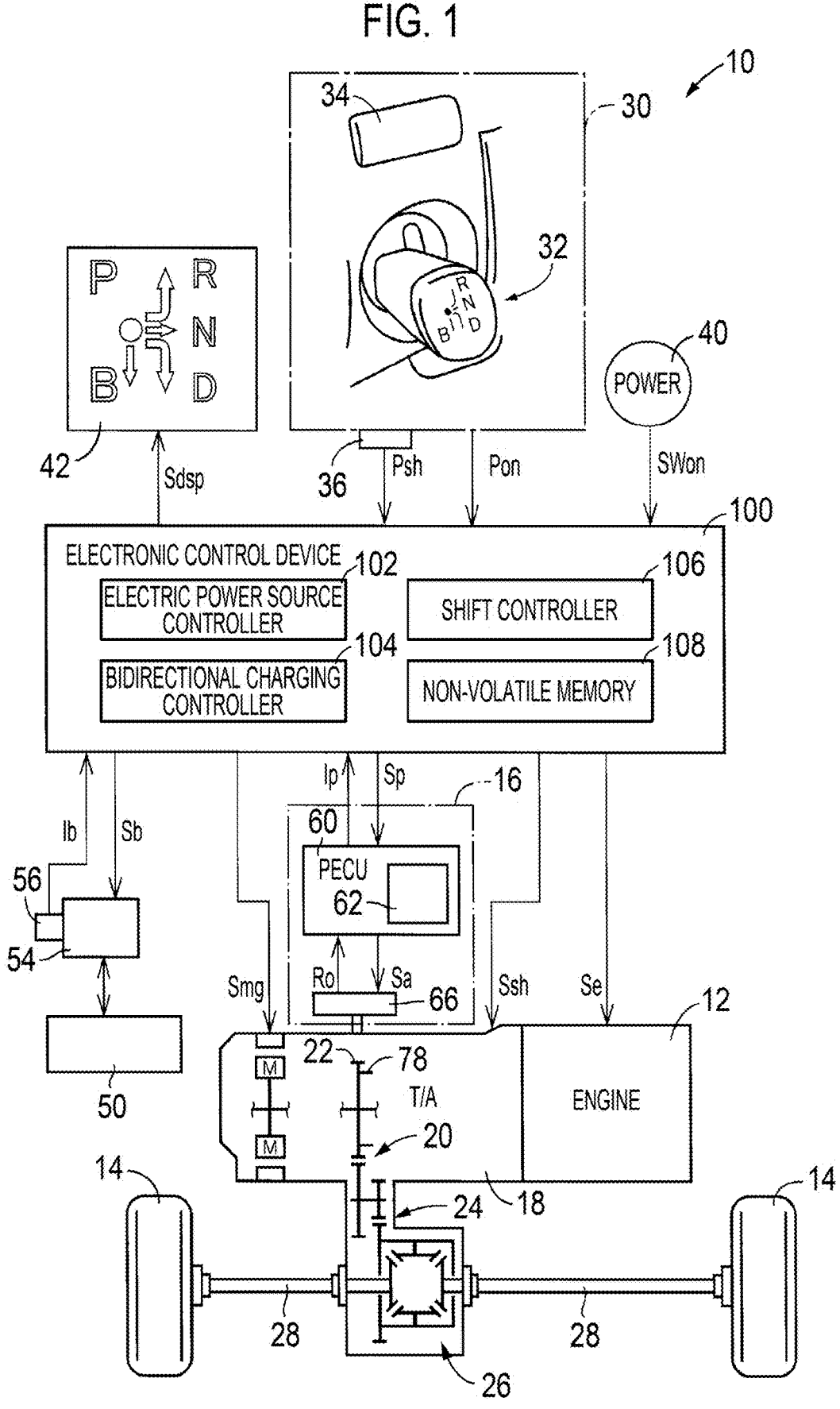
FIG. 1 is a diagram illustrating a schematic configuration of a vehicle to which the present disclosure is applied, and main parts of a control function and a control system for various controls in the vehicle.

FIG. 1 is a diagram illustrating a schematic configuration of a vehicle 10 to which the present disclosure is applied, and main parts of a control function and a control system for various controls in a vehicle 10. In FIG. 1, the vehicle 10 is a hybrid electric vehicle including an engine 12 and an electric motor M as a drive power source. The present disclosure is not limited to the hybrid electric vehicle, and can be applied to a vehicle including solely the electric motor M or solely the engine as a drive power source. The vehicle 10 includes a parking lock device 16, a transmission 18, a shift operation device 30, a shift range display device 42, a battery 50 for driving the electric motor M and the like, and a bidirectional charging device 54 that performs electric power charging from an outside of the vehicle 10 or electric power supply to the outside of the vehicle 10. The vehicle 10 adopts a shift-by-wire (SBW) system that electrically switches a shift position of the vehicle 10 related to traveling of the vehicle 10, that is, a shift position of the transmission 18. The transmission 18 transmits the power of the engine 12 to a pair of drive wheels 14 from an output gear 22 of the transmission 18 through a counter gear pair 20, a final gear pair 24, a differential gear device (differential gear) 26, and a pair of axles 28. The engine is an internal combustion engine as a drive power source for traveling. The output gear 22 is an output rotating member of the transmission 18 that constitutes one of the counter gear pair 20. The counter gear pair 20 is a part of a power transmission device. The transaxle (T/A) is constituted by the transmission 18, the counter gear pair 20, the final gear pair 24, a differential gear device (differential gear) 26, and the like. The bidirectional charging device 54 is a device that charges the battery 50 with electric power from the outside of the vehicle 10 or supplies electric power from the battery 50 to the outside (hereinafter, referred to as external bidirectional charging), and is controlled by an electronic control device 100 described below.

The parking lock device 16 includes a parking lock ECU (hereinafter, referred to as PECU) 60, a parking lock mechanism (hereinafter, referred to as P lock mechanism) 66, and the like. The PECU 60 includes a so-called microcomputer. The PECU 60 selectively switches a parking switching position (hereinafter, referred to as a P switching position) Ppos of the parking lock device 16 by controlling the P lock mechanism 66 based on a command from the electronic control device 100 described below. The P switching position Ppos is selectively switched to a parking lock position (hereinafter, referred to as a P lock position) Plp in a parking lock state and a non-parking lock position (hereinafter, referred to as a non-P lock position) NPlp in the state where the parking lock is released. In addition, the PECU 60 includes a non-volatile memory 62 as a non-volatile storage medium.

The vehicle 10 includes an electronic control device 100 for controlling the vehicle 10. The electronic control device 100 includes a so-called microcomputer. In addition, the electronic control device 100 includes a non-volatile memory 108 as a non-volatile storage medium. The PECU 60 and the electronic control device 100 correspond to a "vehicle control apparatus" of the present disclosure.

The electronic control device 100 receives, for example, the following signals: a shift lever position signal Psh from a shift sensor 36 that is a position sensor for detecting an operation position of a shift lever 32; a P switch signal Pon that represents an operation of a P switch 34 for switching a shift range POSsh of the transmission 18 to a parking range; P lock information Ip that is a notification of an operation state of the parking lock device 16 from the PECU 60; a power switch signal SWon that represents an operation of a vehicle electric power source switch 40 for switching an electric power supply state of the vehicle 10; and a bidirectional charging port signal Ib that is a notification of connection to an external connection port 56 of the bidirectional charging device 54.

The vehicle electric power source switch 40 is, for example, a momentary push button switch that is operated to switch an electric power source state PWst of the vehicle 10 disposed near a driver's seat. From the vehicle electric power source switch 40, the power switch signal SWon is output solely during the pressing operation, that is, the power switch signal SWon is turned on.

The electronic control device 100 outputs, for example, the following signals: an engine output control signal Se for controlling the output of the engine 12; a hybrid control signal for controlling the drive of the electric motor M in the transmission 18 or for controlling a gearshift of the transmission 18; a shift position switching control signal Ssh for switching the shift position of the transmission 18; a shift position display control signal Sdsp for operating the shift range display device 42 to display a switching state of the shift range POSsh in the transmission 18; a PECU control signal Sp for controlling the parking lock device 16 in the PECU 60; and a bidirectional charging control signal Sb for controlling the external bidirectional charging for the bidirectional charging device 54.

In addition, the electronic control device 100 functionally includes an electric power source controller 102, a bidirectional charging controller 104, a shift controller 106, and the like.

The electric power source controller 102 switches an electric power source state PWst that is an electric power supply state of the vehicle 10. The electric power source controller 102 sequentially switches the electric power source state PWst to an IG-on state Igon, an accessory power-on state ACCon, and a power-off state Poff by the pressing operation of the vehicle electric power source switch 40. The IG-on state Igon is a power-on state for enabling the vehicle to travel. The accessory power-on state ACCon is a state in which the power supply related to vehicle travel is turned off to disable vehicle travel, and the power supply not related to the vehicle travel is turned on to make a part of the functions of the vehicle 10 operable. The power-off state Poff is a state in which all the power supplies are turned off. Here, a state in which the accessory power-on state ACCon or the power-off state Poff is referred to as an IG-off state Igoff. The electric power source controller 102 switches the power source to the accessory power-on state ACCon when the connection of the bidirectional charging device 54 to the external connection port 56 of the bidirectional charging device 54 is detected by the bidirectional charging port signal Ib, for example, in the power-off state Poff, such that the bidirectional charging device 54 is operable. It should be noted that IG-on state Igon corresponds to the "ignition-on state" in the present disclosure, and IG-off state Igoff corresponds to the "ignition-off state" in the present disclosure.

The bidirectional charging controller 104 controls the external bidirectional charging. The bidirectional charging controller 104 transmits the bidirectional charging control signal Sb to the bidirectional charging device 54 and performs the external bidirectional charging when an instruction to perform the external bidirectional charging is issued by connection detection to the external connection port 56 of the bidirectional charging device 54 or by a console operation (not illustrated) or the like.

In addition, the bidirectional charging controller 104 confirms that the P switching position Ppos is the P lock position Plp before the external bidirectional charging. This is because, in the implementation of the external bidirectional charging, the P lock position Plp is essential from the viewpoint of the prevention of an accident due to the rolling or the cable dragging of the vehicle 10 and the safety assurance due to the connection with the high-voltage system (the battery 50 and the like).

The shift controller 106 switches the shift range POSsh of the transmission 18 based on the shift lever position signal Psh or the P switch signal Pon. The shift range POSsh includes, for example, a forward traveling range, a rearward traveling range, a neutral range, and a parking range. In a case where an input of the P switch signal Pon is detected when the shift range POSsh is in a non-parking range, the shift controller 106 outputs a signal such that the shift range POSsh is set to the parking range. Specifically, the shift controller 106 outputs the shift position switching control signal Ssh to the transmission 18, and outputs the PECU control signal Sp to the PECU 60 such that the P switching position Ppos of the parking lock device 16 is set to the P lock position Plp.

In a case where an input of the shift lever position signal Psh is detected when the shift range POSsh is in the parking range, the shift controller 106 outputs a signal such that the shift range POSsh is switched to the requested shift range POSsh. Specifically, the shift controller 106 outputs the PECU control signal Sp to the PECU 60 such that the P switching position Ppos is set to the non-P lock position NPlp, and outputs the shift position switching control signal Ssh to the transmission 18.

In addition, when the switching to the IG-off state Igoff is performed, the shift controller 106 stores the P switching position Ppos at the time of switching in the non-volatile memory 108 as the previous position Mpp2.

Further, the shift controller 106 outputs a shift position display control signal Sdsp for displaying the switching state of the shift range POSsh to the shift range display device 42.

Figure 2:
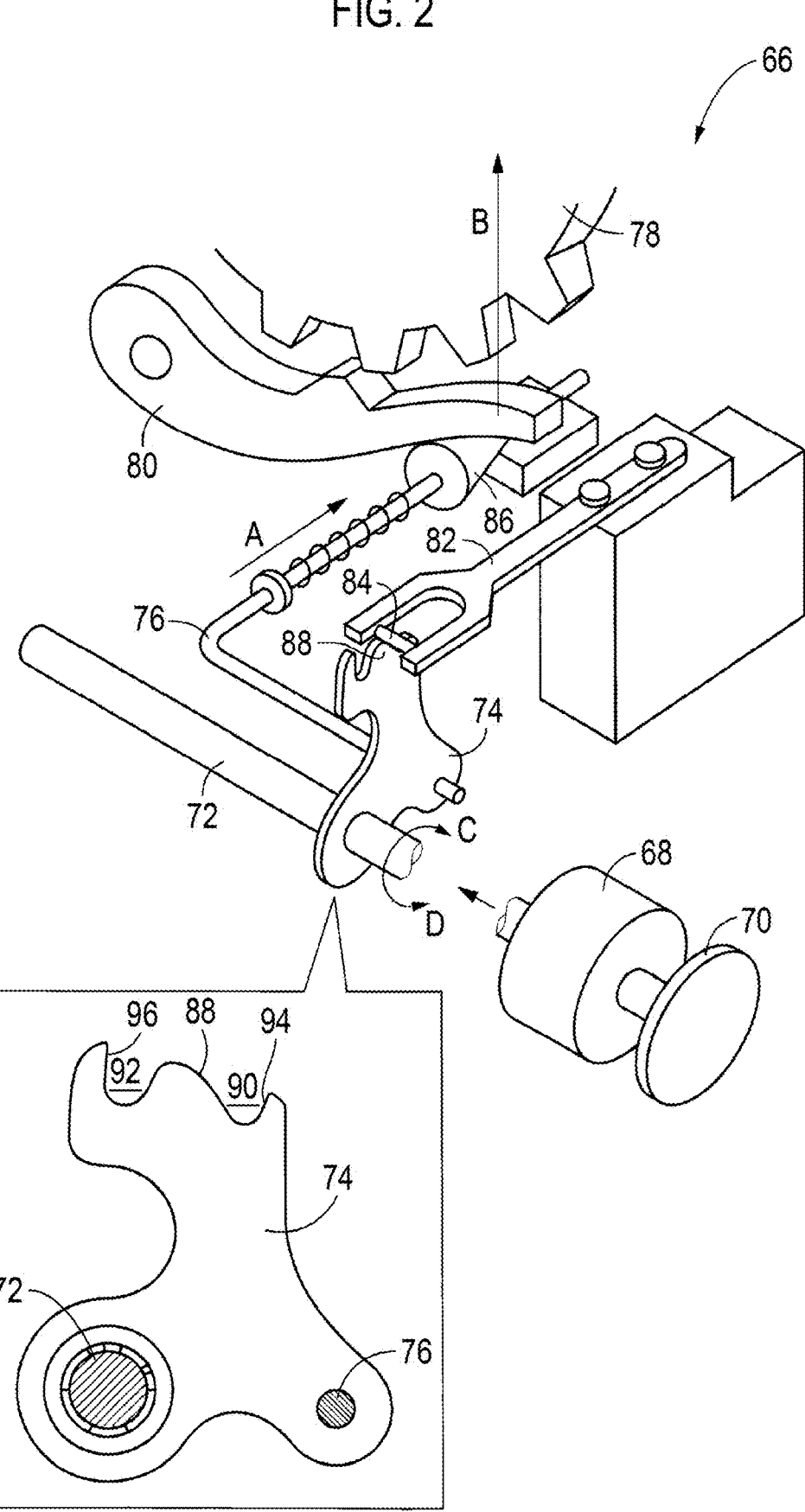
FIG. 2 is a perspective view illustrating an example of a configuration of a parking lock mechanism of FIG. 1.

FIG. 2 is a perspective view illustrating an example of the configuration of the P lock mechanism 66. The P lock mechanism 66 includes, for example, the following components: an electric actuator 68; an encoder 70; a shaft 72 rotationally driven by the actuator 68; a detent plate 74 functioning as a positioning member switching between a P lock position Plp and a non-P lock position NPlp by rotating in conjunction with the rotation of the shaft 72; a rod 76 operating in conjunction with the rotation of the detent plate 74; a parking gear 78 (see FIG. 1) fixed on the output gear 22 of the transmission 18 to be concentric with the output gear 22 and rotates in conjunction with the rotation of the drive wheels 14; a parking lock pole 80 that locks the parking gear 78 to prevent the rotation of the parking gear 78; a detent spring 82 restricting the rotation of the detent plate 74 to fix the shift position; and a roller 84.

Further, a detailed shape of the detent plate 74 is illustrated in a balloon in FIG. 2. On both sides of a peak 88, a P position 92 having a valley shape for positioning corresponding to the P lock position Plp and a non-P position 90 having a valley shape for positioning corresponding to the non-P lock position NPlp are provided, respectively. In addition, in each of the valleys, a wall is provided on a surface located on a side away from the peak 88. The wall is located at a position where the roller 84 collides with the wall when the roller 84 of the detent spring 82 climbs over the peak 88 and falls into the valley, and the wall at the P position 92 is referred to as a "P wall", and the wall at the non-P position 90 is referred to as a "non-P wall". The rotation amount of the detent plate 74, that is, the rotation amount of the actuator 68 is restricted by the P wall 96 and the non-P wall 94.

FIG. 2 illustrates a state at a non-P lock position NPlp. In this state, when the shaft 72 is rotated in a direction of arrow C, the rod 76 is pushed in a direction of arrow A, and the parking lock pole 80 is pushed up in a direction of arrow B. As the detent plate 74 rotates, the roller 84 at the non-P position 90 moves over the peak 88 to the P position 92. When the detent plate 74 is rotated until the roller 84 comes to the P position 92, the parking lock pole 80 is pushed up to a position where the parking gear 78 engages with the parking lock pole 80 by a taper member 86. As a result, the rotation of the parking gear 78 is mechanically stopped, and the P switching position Ppos is switched to the P lock position Plp. In addition, when the shaft 72 is rotated from the P lock position Plp in the direction of the arrow D, the roller 84 at the P position 92 moves to the non-P position 90 by climbing over the peak 88 as the detent plate 74 rotates.

Then, the rod 76 returns in a direction opposite to the arrow A, and the engagement between the parking lock pole 80 and the parking gear 78 is released. As a result, the P switching position Ppos is switched to the non-P lock position NPlp.

The encoder 70 is, for example, a rotary encoder, is integrally rotated with the actuator 68, and supplies a pulse signal Ro for acquiring a count value (encoder count) corresponding to a movement amount (rotation amount) of the actuator 68 to the PECU 60.

The PECU 60 controls a drive signal Sa of the actuator 68 such that the movement amount of the actuator 68 from the reference position is a target movement amount set in advance based on the encoder count, with the P wall 96 and the non-P wall 94 as the reference position.

The encoder 70 is a relative position sensor, and the PECU 60 loses the information on an absolute position of the actuator 68, for example, the position of the P wall 96 and the position of the non-P wall 94, and the accompanying P switching position Ppos in the case of the IG-off state Igoff. Therefore, the PECU 60 executes the wall abutment control to recognize the absolute position of the actuator 68 and the P switching position Ppos when the switching to the IG-on state Igon is performed. The wall abutment control is executed as an initialization control of the parking lock device 16. The wall abutment control is a control of detecting the position of the P wall 96 of the actuator 68 and the position of the non-P wall 94 to set a reference position.

FIG. 3 is a diagram illustrating an outline of wall abutment control in a case where the position of the P wall 96 is detected. In FIG. 3, the PECU 60 rotates the detent plate 74 in the direction of the arrow C illustrated in FIG. 2 by a rotation force F1 of the actuator 68 and presses the P wall 96 against the roller 84. When the rotation force F1 is balanced with a spring force F2 due to a deflection of the detent spring 82 and a restoring force F3 by the rod 76, the rotation of the detent plate 74 is stopped, and the rotation stop is detected. The detection is performed, for example, by determining that the rotation is stopped when the encoder count is stopped, that is, when a minimum value or a maximum value of the encoder count does not change for a predetermined time. Then, a detection position obtained by stopping the encoder count is set as the reference position of the P position 92, thereby controlling the movement amount from the reference position based on the encoder count in the subsequent operation. With this method, it is possible to control the absolute position of the actuator 68. The wall abutment control is known and a detailed description thereof will be omitted. Further, the reference position of the non-P position 90 is set with respect to the non-P wall 94 by the same method.

As described above, the PECU 60 executes the wall abutment control to initialize the parking lock device 16 in a case where the switching to the IG-on state Igon is performed. The PECU 60 executes control for determining an initial position (P lock position Plp or non-P lock position NPlp) of the P switching position Ppos (hereinafter, referred to as initial position determination control). In addition, the PECU 60 transmits the result of the initial position determination control as the initial position Rp to the electronic control device 100. The initial position Rp is, for example, any of a P lock position Plp, a non-P lock position NPlp, and an incomplete determination Uk indicating that the initial position determination control is not completed.

When the switching to the IG-off state Igoff is performed, the PECU 60 stores the P switching position Ppos at the time of switching as the previous position Mpp1 in the non-volatile memory 62. In addition, the previous position Mpp1 is transmitted to the electronic control device 100 at the same time as the transmission of the initial position Rp. Further, at the time when the parking lock device 16 is replaced, an undetermined position Up indicating that the P switching position Ppos is undetermined is stored in the previous position Mpp1.

By the way, in the related art, the P switching position Ppos was able to be determined solely after the switching to the IG-on state Igon is performed, but for example, when the external bidirectional charging is performed, the IG-off state Igoff is remained, with a problem that the parking switching position is not able to be determined. As a measure, in a case where the external bidirectional charging is performed, it is conceivable to perform the initial position determination control to determine the P switching position Ppos. However, the method may lead to an increase in the number of times of performing the initial position determination control including the wall abutment control, and may affect the durability of the parking lock device 16.

In addition, when the external bidirectional charging is performed, a measure of referring to the previous position Mpp2 stored in the non-volatile memory 108 to determine the P switching position Ppos is also considered. However, in this method, since the storage is performed by using a single non-volatile memory, there is a possibility of an erroneous determination even though the actual position is not the P lock position Plp, for example, when the parking lock device 16 is replaced. Therefore, there is a demand for increasing the accuracy of the determination.

FIG. 4 is a block diagram illustrating a flow of processing data for the determination control of the parking switching position of the electronic control device 100 in the IG-off state Igoff, and illustrates a control example in a case where the external bidirectional charging is performed. In FIG. 4, numbers in parentheses indicate the order of the processing (processing order), and a parallelogram frame indicates an output result or a value of each of the processing. Hereinafter, the description will be provided in the processing order.

In the processing of (1) in FIG. 4, when the external bidirectional charging is performed, the bidirectional charging controller 104 inquires of the shift controller 106 about the P switching position Ppos. Next, in the processing of (2), the shift controller 106 sets the PECU 60 to the activation state, and receives the previous position Mpp1 and the initial position Rp from the PECU 60. Further, in the processing of (3), the shift controller 106 receives the electric power source state PWst from the electric power source controller 102, and in a case of the IG-off state Igoff and when the determination of the initial position Rp is an incomplete determination Uk in the power source state PWst, the shift controller 106 acquires the previous position Mpp2 from the non-volatile memory 108 in the processing of (4). Next, in the process of (5), the shift controller 106 compares the previous position Mpp1 with the previous position Mpp2. When both the previous positions Mpp1, Mpp2 match the P lock position Plp (Mpp1=Mpp2=Plp), the P switching position Ppos is determined to be the P lock position Plp (Ppos=Plp). When both the previous positions Mpp1, Mpp2 match the non-P lock position NPlp (Mpp1=Mpp2=NPlp), the P switching position Ppos is determined to be the non-P lock position NPlp (Ppos=NPlp). When both the previous positions Mpp1, Mpp2 do not match or there is the undetermined position Up, the PECU 60 is instructed to perform the initial position determination control, and the P switching position Ppos is then determined by reacquiring the initial position Rp that is the result of the control. In the process of (6), the shift controller 106 transmits the determined P switching position Ppos to the bidirectional charging controller 104. The bidirectional charging controller 104 starts the operation of the external bidirectional charging after confirming that the transmitted P switching position Ppos is the P lock position Plp. As a result, in the IG-off state Igoff, in a case where the previous position Mpp1 and the previous position Mpp2 match the P lock position Plp or the non-P lock position NPlp, the determination of the P switching position Ppos is made without performing the initial position determination control. As a result, the P switching position Ppos is determined with high accuracy. In addition, in a case where the parking lock device 16 is replaced, the previous position Mpp1 of the non-volatile memory 62 is the undetermined position Up, and the previous position Mpp1 and the previous position Mpp2 do not match. Therefore, an erroneous determination of the P switching position Ppos in the IG-off state Igoff as the P lock position Plp is avoided. Then, the initial position determination control is performed, and the P switching position Ppos is determined.

Figure 5:
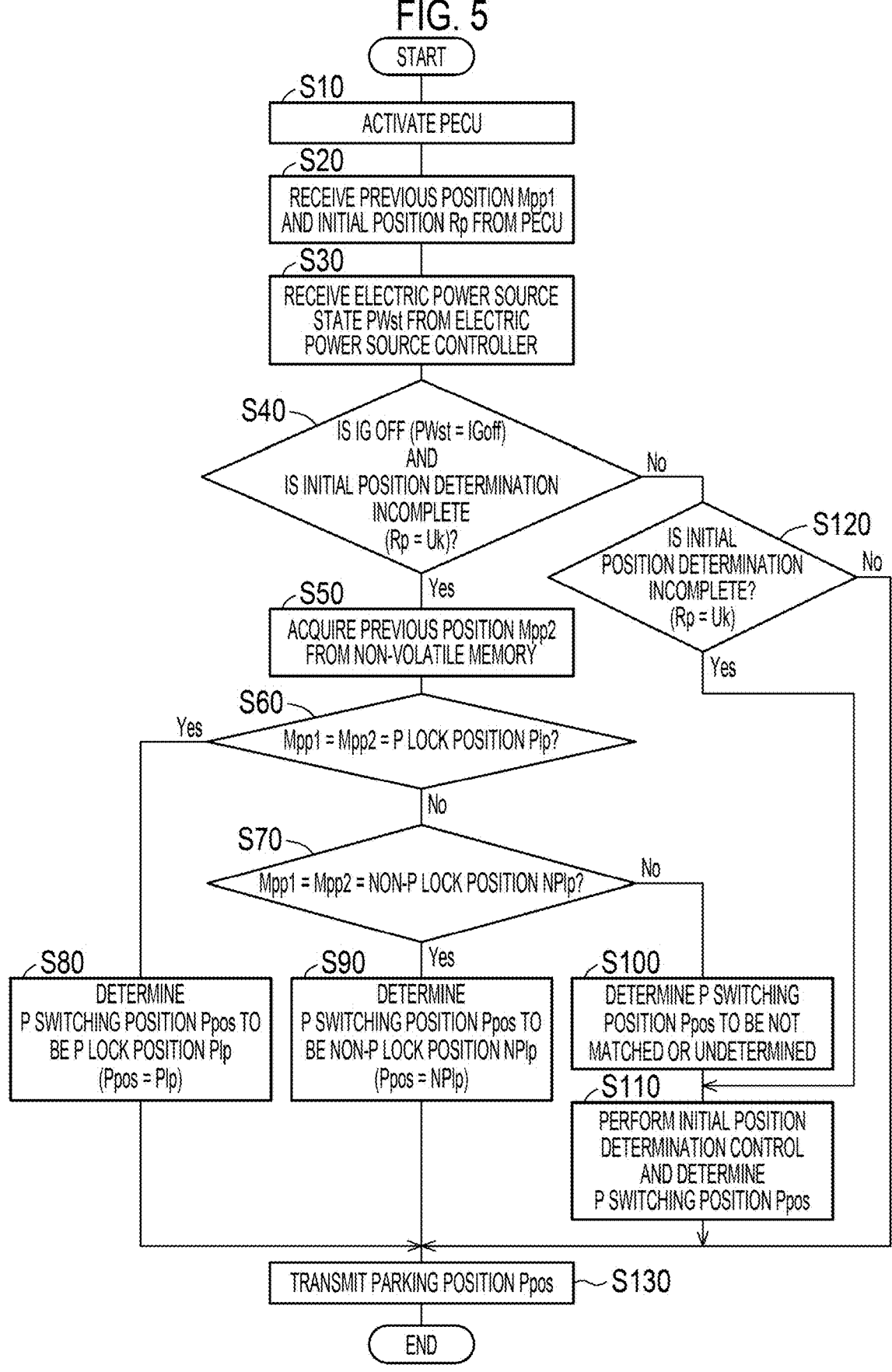
FIG. 5 is a flowchart illustrating an example of the determination control of the parking switching position of the vehicle control apparatus, and corresponds to FIG. 4.

FIG. 5 is a flowchart corresponding to FIG. 4 illustrating an example of the determination control of the parking switching position executed by the shift controller 106 that is functionally provided in the electronic control device 100. The flowchart is executed when the shift controller 106 is inquired of the P switching position Ppos. The inquiry of the P switching position Ppos corresponds to the processing of (1) in FIG. 4, for example.

First, in step (hereinafter, the step is omitted) S10, the PECU 60 is activated. Next, in S20, the previous position Mpp1 and the initial position Rp are received from the PECU 60, and in S30, the electric power source state PWst is received from the electric power source controller 102. S20 corresponds to the processing of (2) in FIG. 4, and S30 corresponds to the processing of (3) in FIG. 4.

Next, in S40, determination is made whether determinations of the IG-off state Igoff (PWst=IGoff) and the initial position Rp are incomplete (Rp=incomplete determination Uk). When the determination in S40 is affirmative, in S50, the previous position Mpp2 is acquired from the non-volatile memory 108. S50 corresponds to the processing of (4) in FIG. 4.

Next, in S60, determination is made whether the previous position Mpp1 and the previous position Mpp2 match the P lock position Plp (Mpp1=Mpp2=Plp). When the determination in S60 is affirmative, in S80, the P switching position Ppos is determined to be the P lock position Plp (Ppos=Plp). When the determination in S60 is negative, in S70, determination is made whether the previous position Mpp1 and the previous position Mpp2 match the non-P lock position NPlp (Mpp1=Mpp2=NPlp). When the determination in S70 is affirmative, in S90, the P switching position Ppos is determined to be the non-P lock position NPlp (Ppos=NPlp). When the determination in S70 is negative, in S100, the P switching position Ppos is determined to be the mismatch or the undetermined position Up. Then, in S110, the initial position Rp is reacquired by performing the initial position determination control in the PECU 60, and the P switching position Ppos is determined. The processing from S60 to S110 corresponds to the processing of (5) in FIG. 4.

When the determination in S40 is negative, in S120, determination is made whether the initial position determination is incomplete (Rp=incomplete determination Uk). When the determination in S120 is affirmative, the process proceeds to S110, and the initial position determination control is performed. When the determination in S120 is negative, the P switching position Ppos is determined, accordingly, the process proceeds to S130.

Then, in S130, the determined P switching position Ppos is transmitted to the inquiry source, and the present routine is terminated. S130 corresponds to the processing of (6) in FIG. 4.

As described above, according to the present embodiment, in a case where the switching to the IG-off state Igoff is performed, the P switching position Ppos at the time of switching to the IG-off state Igoff is stored in each of the non-volatile memories 62, 108 as the previous positions Mpp1, Mpp2. When the previous positions Mpp1, Mpp2 acquired from each of the non-volatile memories 62, 108 match the P lock position Plp or the non-P lock position NPlp in the IG-off state Igoff, the previous positions Mpp1, Mpp2 that are matched are determined to be the P switching position Ppos in the IG-off state Igoff. As a result, even in the case of the IG-off state Igoff, the P switching position Ppos is determined with high accuracy without performing an initial position determination control.

In addition, according to the present embodiment, the non-volatile memory 62 is provided in the parking lock device 16. As a result, in a case where the parking lock device 16 is replaced, the previous position Mpp1 of the non-volatile memory 62 is an undetermined value, and the previous position Mpp1 and the previous position Mpp2 do not match. Therefore, an erroneous determination of the P switching position Ppos in the IG-off state Igoff as the P lock position Plp is avoided. In addition, in a case where the parking lock device 16 is replaced, the initial position determination control is performed, accordingly, the P switching position Ppos is determined.

Next, another embodiment of the present disclosure will be described. In the following description, the same reference numerals are given to the same parts in the embodiments, and the description thereof will be omitted.

Embodiment 2

Figure 6:
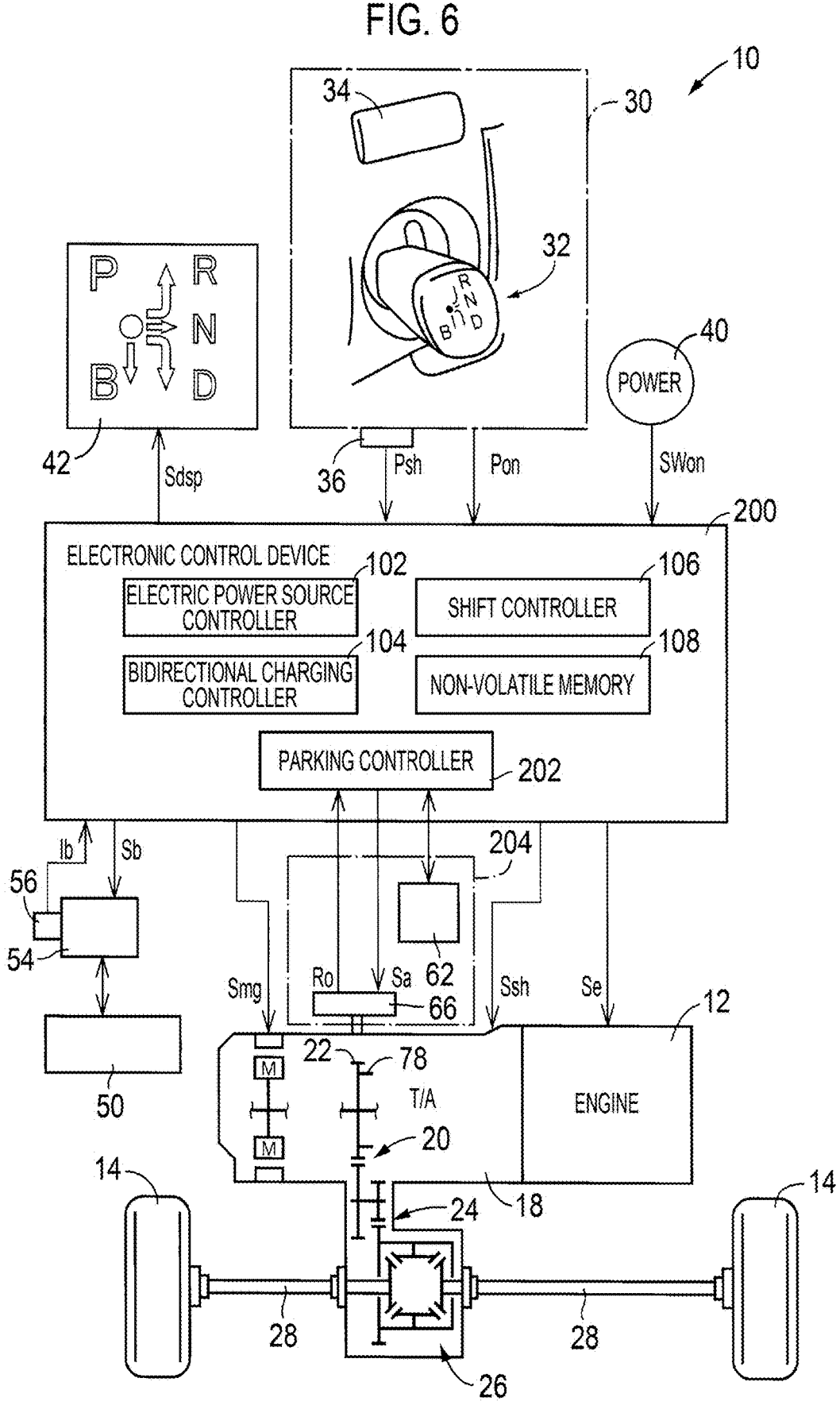
FIG. 6 is a diagram illustrating another embodiment of the vehicle control apparatus.

FIG. 6 is an example in which the PECU 60 is functionally incorporated into the electronic control device 200 as a parking controller 202 for the electronic control device 100 and the parking lock device 16 of the first embodiment described above. Note that the non-volatile memory 62 is provided in the parking lock device 204, and the electronic control device 200 (parking controller 202) stores and acquires the previous position Mpp1. In the present example, the same operation as that of the PECU 60 of Embodiment 1 is performed by the parking controller 202, so that the same effect as that of Embodiment 1 can be obtained.

Although the embodiments of the present disclosure have been described in detail based on the drawings, the present disclosure is also applicable to other aspects.

For example, in the Embodiment 1 and Embodiment 2, the non-volatile memories (62, 108) are two, but the non-volatile memories may be three or more.

The above description is merely one embodiment, and the present disclosure can be implemented in various modified and improved aspects based on the knowledge of those skilled in the art.

What is claimed is:

1. A vehicle control apparatus for a vehicle that includes a parking lock device configured to selectively switch, by driving an actuator, a parking switching position between a parking lock position and a non-parking lock position, and in which an electric power source state is switched between an ignition-on state in which vehicle travel is enabled and an ignition-off state in which a power supply related to vehicle travel is turned off and vehicle travel is disabled, the vehicle control apparatus including an electronic control device being configured to perform, in a case where switching to the ignition-on state is performed, initial position determination control of recognizing and determining the parking switching position at a time of switching to the ignition-on state by driving the actuator, wherein:

the electronic control device is configured to store, in a case where switching to the ignition-off state is performed, the parking switching position at a time of switching to the ignition-off state in each of a plurality of non-volatile memories as a previous position; and the electronic control device is configured to determine, in a case where the previous position acquired from each of the non-volatile memories matches the parking lock position or the non-parking lock position in the ignition-off state, the previous position that is matched, as the parking switching position in the ignition-off state.

2. The vehicle control apparatus according to claim 1, wherein one of the non-volatile memories is provided in the parking lock device.

\* \* \* \* \*